(12) United States Patent
Kloepfer (10) Patent No.: US 7,967,357 B2
(45) Date of Patent: Jun. 28, 2011

(54) CONVERTIBLE TRAILER

(75) Inventor: Michael Kloepfer, Delhi (CA)

(73) Assignee: Titan Trailers, Inc., Ontario (CA)

( * ) Notice: Subject to any disclaimer, the term of this patent is extended or adjusted under 35 U.S.C. 154(b) by 219 days.

(21) Appl. No.: 12/345,718

(22) Filed: Dec. 30, 2008

(65) Prior Publication Data

US 2010/0164190 A1 Jul. 1, 2010

(51) Int. Cl.
*B60P 7/02* (2006.01)
*B61D 39/00* (2006.01)
*B61D 3/06* (2006.01)

(52) U.S. Cl. ............. 296/40; 105/377.05; 105/377.11; 296/100.02; 296/100.03; 296/100.06; 296/100.07

(58) Field of Classification Search ............ 105/377.01, 105/377.04, 377.05, 377.06, 377.09, 377.11; 296/100.01, 100.02, 100.03, 100.04, 100.05, 296/100.06, 100.07, 100.1, 219, 40; 410/106, 410/108, 110, 120; 414/525.2
See application file for complete search history.

(56) References Cited

U.S. PATENT DOCUMENTS

| | | | | | |
|---|---|---|---|---|---|
| 337,831 | A | * | 3/1886 | Good et al. ............. | 105/377.09 |
| 571,577 | A | * | 11/1896 | Richards ................. | 105/377.09 |
| 2,312,512 | A | * | 3/1943 | Wiemer .................. | 296/100.02 |
| 2,408,132 | A | * | 9/1946 | Weeks .................... | 296/223 |
| 2,997,967 | A | * | 8/1961 | Malapert ................ | 105/377.02 |
| 3,186,756 | A | * | 6/1965 | Barker et al. ........... | 296/100.03 |
| 3,450,431 | A | * | 6/1969 | Tyler ...................... | 296/100.06 |
| 3,472,548 | A | * | 10/1969 | Comisac ................. | 296/183.2 |
| 3,913,969 | A | * | 10/1975 | Hoch ....................... | 296/100.1 |
| 4,302,044 | A | * | 11/1981 | Sims ....................... | 296/186.4 |
| 4,435,010 | A | * | 3/1984 | Mandel ................... | 296/100.06 |
| 4,542,931 | A | * | 9/1985 | Walker, Jr. .............. | 296/100.1 |
| 4,627,658 | A | * | 12/1986 | Vold et al. ............... | 296/100.1 |
| 4,979,866 | A | | 12/1990 | Croy | |
| 5,238,359 | A | * | 8/1993 | Chen ....................... | 414/517 |
| 5,820,192 | A | * | 10/1998 | Yarnavick ............... | 296/40 |
| 6,017,081 | A | | 1/2000 | Colby | |
| 6,142,553 | A | * | 11/2000 | Bodecker ................ | 296/98 |
| 6,152,511 | A | | 11/2000 | Gustafson | |
| 6,286,894 | B1 | | 9/2001 | Kingham | |
| 6,598,930 | B1 | * | 7/2003 | Tilton ..................... | 296/100.06 |
| 2007/0126209 | A1 | | 6/2007 | Wolfe | |

(Continued)

FOREIGN PATENT DOCUMENTS

EP 1 120 363 10/2005

(Continued)

*Primary Examiner* — Glenn Dayoan
*Assistant Examiner* — Paul A Chenevert
(74) *Attorney, Agent, or Firm* — McDermott Will & Emery, LLP (57) ABSTRACT

A trailer having a chassis, a set of wheels for rollably supporting the chassis on the ground, and a rigid container carried by the chassis. The rigid container includes a floor, a sidewall, an access door for loading/unloading materials into the container, and a convertible rigid roof. The convertible roof is movable between a closed position which permits waste or other materials to be compressed into the trailer, and an open position which permits the trailer to be loaded with bulk goods from the top. The convertible roof includes movable rigid panels, and a locking bar for holding the panels closed and connecting the opposite sidewalls of the trailer to each other against the expansion pressure exerted by loosely compressed materials transported in the trailer. The panels may be rotating panels hinged to a wall, or may be provided as sliding panels running in tracks.

20 Claims, 11 Drawing Sheets

U.S. PATENT DOCUMENTS

2009/0260305 A1 * 10/2009 Haub et al. .................. 52/281
2011/0030575 A1 * 2/2011 Schaefer et al. ......... 105/377.02

FOREIGN PATENT DOCUMENTS

| | | |
|---|---|---|
| EP | 1120363 | 10/2005 |
| GB | 2 429 006 | 2/2007 |
| GB | 2429006 | 2/2007 |
| JP | 54012167 A * | 1/1979 |
| JP | 01060421 A * | 3/1989 |
| JP | 01-167048 | 6/1989 |
| JP | 01167048 | 6/1989 |

* cited by examiner

CONVERTIBLE TRAILER

FIELD OF THE INVENTION

The present invention relates generally to the field of transportation. More particularly, the present invention relates to a trailer for the transportation of compacted garbage and/or bulk material.

BACKGROUND OF THE INVENTION

Garbage, waste, or any other materials which are compacted for transportation require the use of fixed walled containers or trailers which allow the transportation of materials in compacted form or compacting of the material in the container or trailer itself. These types of trailers cannot backhaul any bulk goods on the way back from the unloading site, as their fixed and closed top does not allow loading from the top using a conventional loader, similar to an open-top trailer.

With the rising cost of fuel, the disposal of garbage becomes increasingly expensive, especially when the trailer cannot backhaul any goods to reduce the cost of waste disposal, and thus, returns empty from the unloading site.

On the other hand, open top trailers, even those which include a cover, cannot be used for compacting or for the transport of loosely compacted material.

United States Patent Application Publication No. 2007/0126209 (Wolfe) describes a trailer that converts into a shed. The trailer of Wolfe includes a convertible roof comprising two panels. However, the panels cannot be locked, and the walls are not rigid enough to withstand compressed materials.

European Patent Application No. 1,120,363 and United Kingdom Patent Application No. 2,429,006 (Sumpter) describe a trailer for the collection of waste comprising a chassis and a container. The container comprises a roof including an aperture closeable by a cover that slides over the aperture by means of a channel assembly. The cover may be a partly or fully retractable flexible sheet.

The structure of Sumpter does not allow the trailer to be used for transporting loosely compressed materials because the materials are distributed in the container using reciprocating slats, not a compactor. Furthermore, the cover disclosed in Sumpter is flexible and would thus not be able to withstand any pressure from within the container. Sumpter clearly does neither teach nor suggest using the container disclosed for transport of loosely compacted materials.

Neither Wolfe nor Sumpter deal with loosely compacted materials, and thus, fail to recognize the structural challenges created by internal pressures in a trailer upon compression of loose materials therein.

It is, therefore, desirable to provide a trailer that can load and contain loosely compacted material, and which can also backhaul bulk goods on the way back from the unloading site in order to reduce the cost of transportation.

SUMMARY OF THE INVENTION

It is an object of the present invention to provide a trailer which can hold loosely compacted material or allows material to be compressed inside the trailer, but can also be loaded from the top to backhaul bulk goods on the way back from an unloading site.

This specification refers to loosely compacted materials which are compacted and maintained in the compacted condition solely by the trailer without any secondary containment or bundling structures. Thus, loosely compacted materials continuously exert an expansion on the containment structure in which they are held.

In an aspect, the invention provides a convertible trailer comprising a chassis, a set of wheels for rollably driving the chassis on the ground, a rigid container carried by the chassis comprising a floor, a wall, and a roof, and an access door for loading loosely compressed materials into the container. The roof includes a movable rigid panel connected to the wall of the container, and movable between a closed position wherein the panel forms part of a solid roof that permits the container to be loaded with loosely compressed materials from the access door, and an open position wherein the container can be loaded from the top with bulk material. The container includes a locking bar for securing the panel in the closed position and for strengthening the wall against the outward pressure exerted by the loosely compressed materials loaded in the container.

The container is preferably rectangular including a rear wall, a front wall and two opposite sidewalls. In an embodiment, the roof includes two panels hinged to the opposite sidewalls of the container. The locking bar is preferably secured to one panel and includes an opening which overlaps at least one threaded hole in the other panel when the panels are in closed position, for releasably locking two panels in the closed position. The locking bar is preferably provided adjacent and substantially aligned with the hinges connecting the panels to the sidewalls, for connecting the opposite sidewalls to each other against the outward pressure exerted by the loosely compressed materials compacted in the trailer.

The container includes a rotation mechanism for moving the panel between the closed position and the open position. The rotation mechanism may be stoppable at any position of the panels.

In another aspect of the invention, the invention provides a convertible container for bulk goods or loosely compacted materials, comprising a floor, a wall, a roof, and an access door for loading loosely compressed materials into the container. The roof includes a movable rigid panel connected to the wall of the container, and movable between a closed position wherein the panel forms part of a solid roof that permits the container to be loaded with loosely compressed materials from the access door, and an open position wherein the container can be loaded from the top with bulk material. The container includes a locking bar for securing the panel in the closed position and for strengthening the wall against the outward pressure exerted by the loosely compressed materials loaded in the container.

In a further aspect, the invention provides a convertible trailer comprising a chassis, a set of wheels for rollably driving said chassis on the ground, a rigid container carried by the chassis comprising a floor, a roof, a front wall, a rear wall and two sidewalls, and an access door for loading loosely compressed materials into the container. The roof includes a plurality of rigid sliding panels movable in tracks between a closed position wherein the panels form part of a solid roof that permits the container to be loaded with loosely compressed materials from the access door, and an open position wherein the container can be loaded from the top with bulk material. The container includes a locking bar for securing the panels in the closed position, and for strengthening the sidewalls against the outward pressure exerted by the loosely compressed materials loaded in the container.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
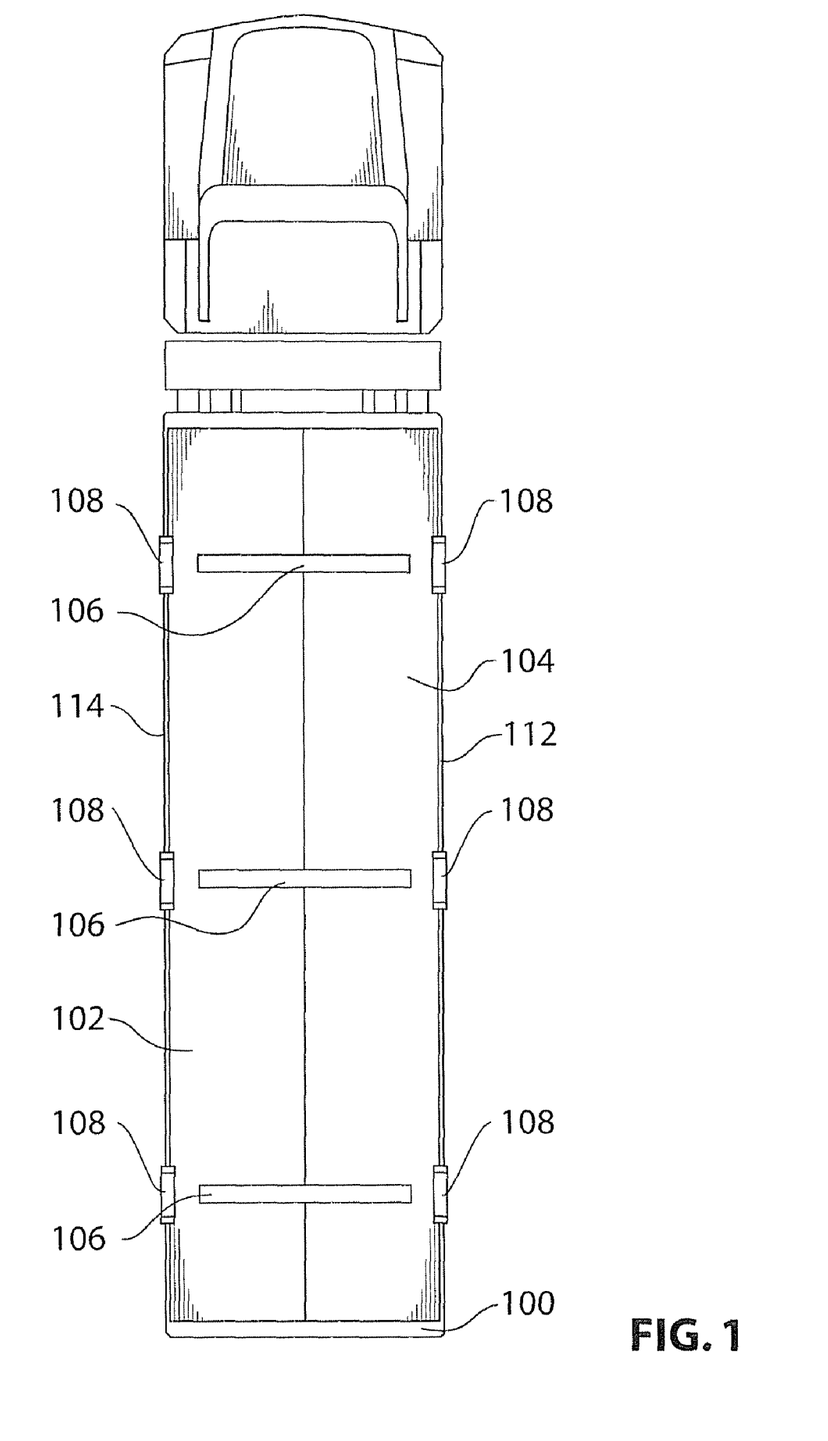
FIG. 1 is a top view of a convertible trailer in accordance with an embodiment of the invention.

Generally, the present invention provides a container for loosely compacted materials which is convertible to a top loading bulk good container. In a preferred embodiment the invention provides a trailer comprising a chassis, a set of wheels for rollably supporting the chassis on the ground, and a rigid container carried by the chassis. The rigid container comprises a floor, a sidewall, an access door for loading/unloading materials into the container, and a convertible rigid roof. The convertible roof is movable between a closed position which permits waste or other materials to be compressed into the trailer, and an open position which permits the trailer to be loaded with bulk goods from the top. The convertible roof includes movable rigid panels, and a locking bar for holding the panels closed and connecting the opposite sidewalls of the trailer to each other against the expansion pressure exerted by loosely compressed materials transported in the trailer. The panels may be rotating panels hinged to a wall, or may be provided as sliding panels running in tracks FIG. 1 illustrates by way of example, a top view of a convertible trailer 100 in accordance with an embodiment of the invention. In the embodiment shown in FIG. 1, the roof of the trailer is made of two movable panels 102 and 104. When the panels 102 and 104 are in a closed position, as illustrated in FIG. 1, the convertible trailer 100 may be loaded with loosely compressed materials, such as garbage, from the access door using a compactor (not shown). The compactor applies pressure on the materials loaded in order to remove gaps for the most efficient use of the space inside the trailer. When the compactor is operated, the roof must be closed and rigid in order to withstand the outward expansion pressure exerted by the loose materials being compacted.

Figure 2:
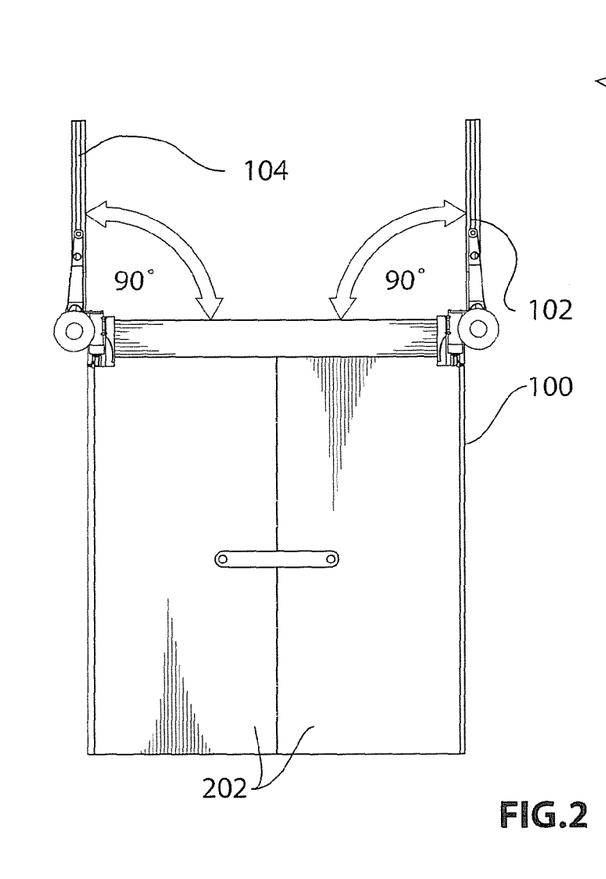
FIG. 2 is a rear view of the container of the trailer when the panels are 90 degrees open.

Once the convertible trailer 100 is unloaded at the unloading site, it may be loaded again to backhaul bulk goods on the return trip, in order to reduce transportation costs. If uncompressed bulk goods are to be transported, the convertible roof of the trailer 100 may be opened to allow the loading of the convertible trailer 100 from the top. For instance, the trailer 100 may be loaded with bulk goods like sand, gravel, or the like using a conventional loader 110. FIG. 2 is a rear view of the container of convertible trailer 100 when the panels 102 and 104 are 90 degrees open, and the access door 202 is closed, while FIG. 3 is a rear view of the container of the convertible trailer 100 when the panels 102 and 104 are fully open (270 degrees), and the trailer is being loaded from the top.

Figure 3:
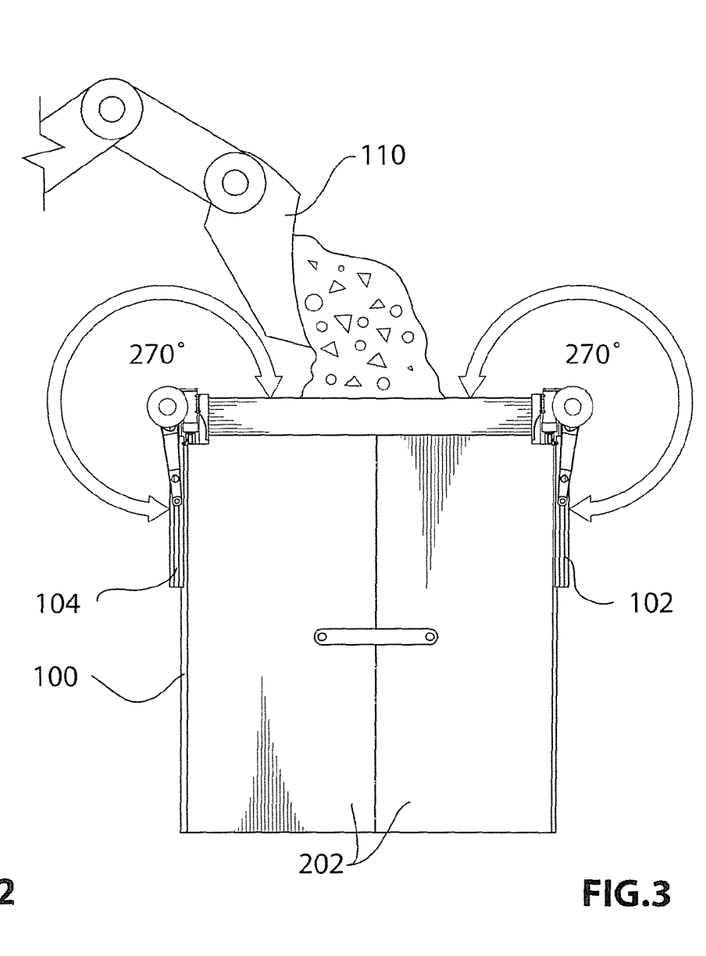
FIG. 3 is a rear view of the container of the trailer when the panels are fully open and the trailer is being loaded from the top.

As shown in FIGS. 1 to 3, panels 102 and 104 are movable between a closed position, in which, the panels are substantially parallel and coplanar so as to form a solid hard roof as shown in FIG. 1, and an open position, in which, the panels are 270 degrees rotated from the closed position and, in which, the panels are substantially parallel to the left and right sidewalls of the trailer, as shown in FIG. 3.

Figure 4:
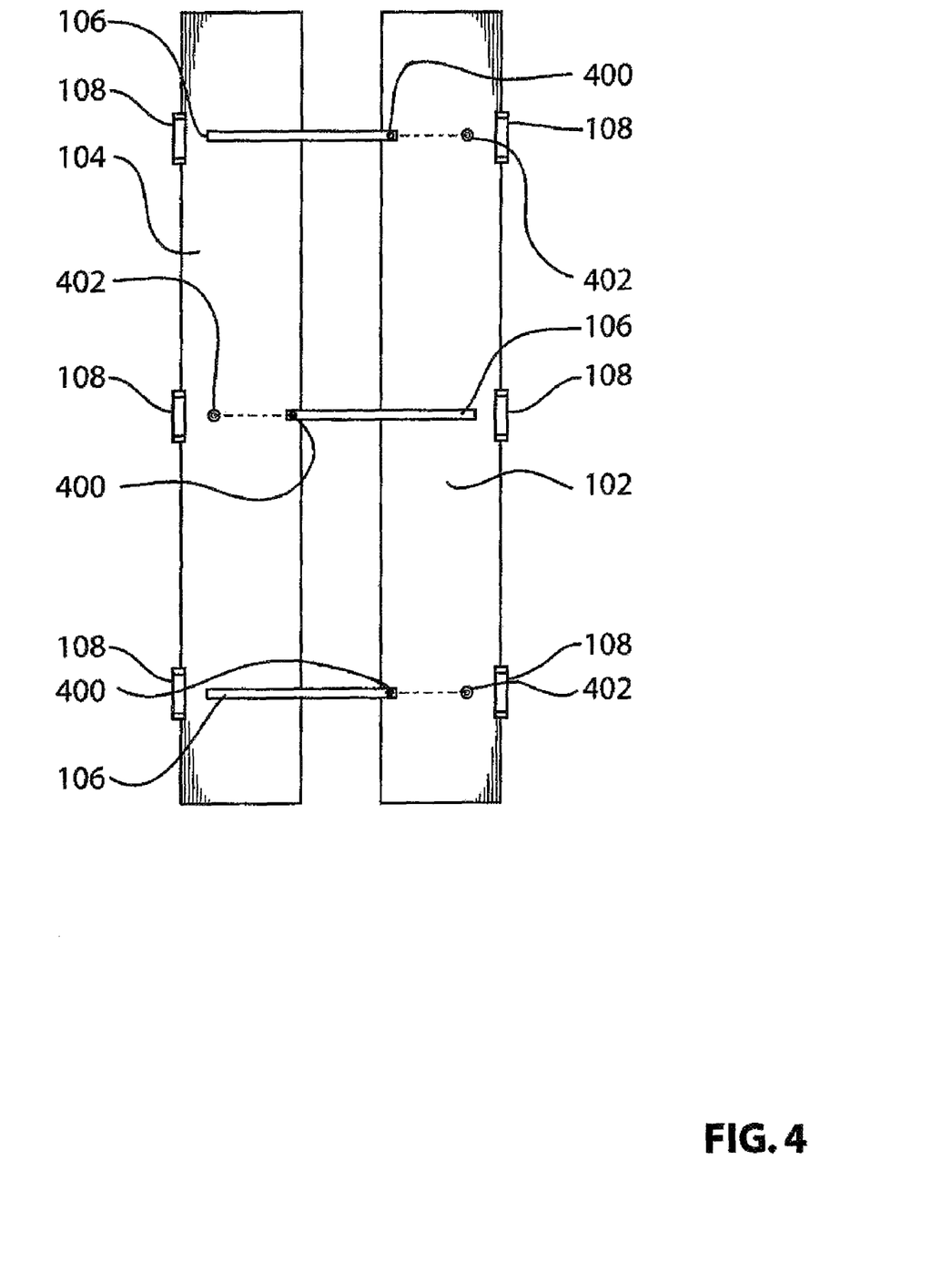
FIG. 4 is an exploded view illustrating an embodiment of the invention, in which, the locking bar is provided at both panels.

When panels 102 and 104 are in the closed position, at least one locking bar 106 secures both panels to each other. The locking bar 106 may be provided on one of the panels or on both. FIG. 4 is an exploded view showing by way of example the locking bar 106 provided at both panels, in accordance with an embodiment of the invention. The locking bar 106 may be welded or permanently secured to one of the panels at one side and has one or more openings 400 at the other side, as illustrated in FIG. 4. The openings 400 provided in the locking bar overlap one or more threaded openings 402 in the other panel when the panels are in closed position for releasably securing the locking bar 106 to the other panel using bolts or the like.

Panels 102 and 104 are connected to the sidewalls of the trailer by hinges 108 as shown in FIGS. 1 and 4. The locking bar 106 is provided adjacent, and preferably aligned with the hinges 108 for connecting the sidewalls 112 and 114 to each other against the outward expansion pressure exerted by the loose materials being compacted for preventing the sidewalls and the roof from bulging out and deforming.

Figure 5:
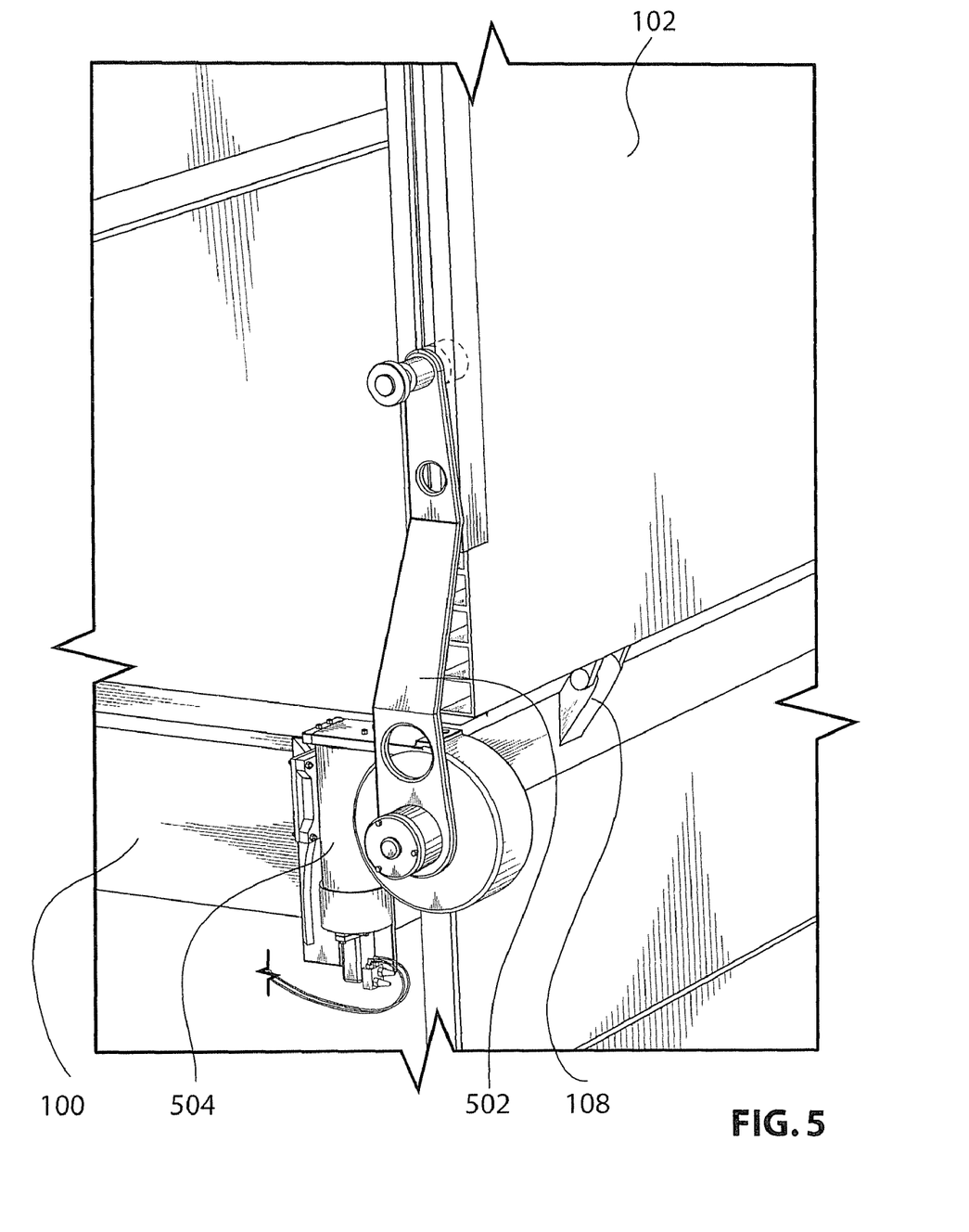
FIG. 5 illustrates the rotation mechanism of the panels.

Panels 102 and 104 are provided with a rotation mechanism that allows them to move between the closed position shown in FIG. 1, and the open position shown in FIG. 3. FIG. 5 illustrates, by way of example, an embodiment of the rotation mechanism that rotates the panels. As shown in FIG. 5, the rotation mechanism includes a bracket 502 and a worm drive or any other suitable rotating means 504. The bracket 502 is provided at the side of each of panels 102 and 104, and connected to the panel at one end and to the motor 504 at the other end.

Figure 6:
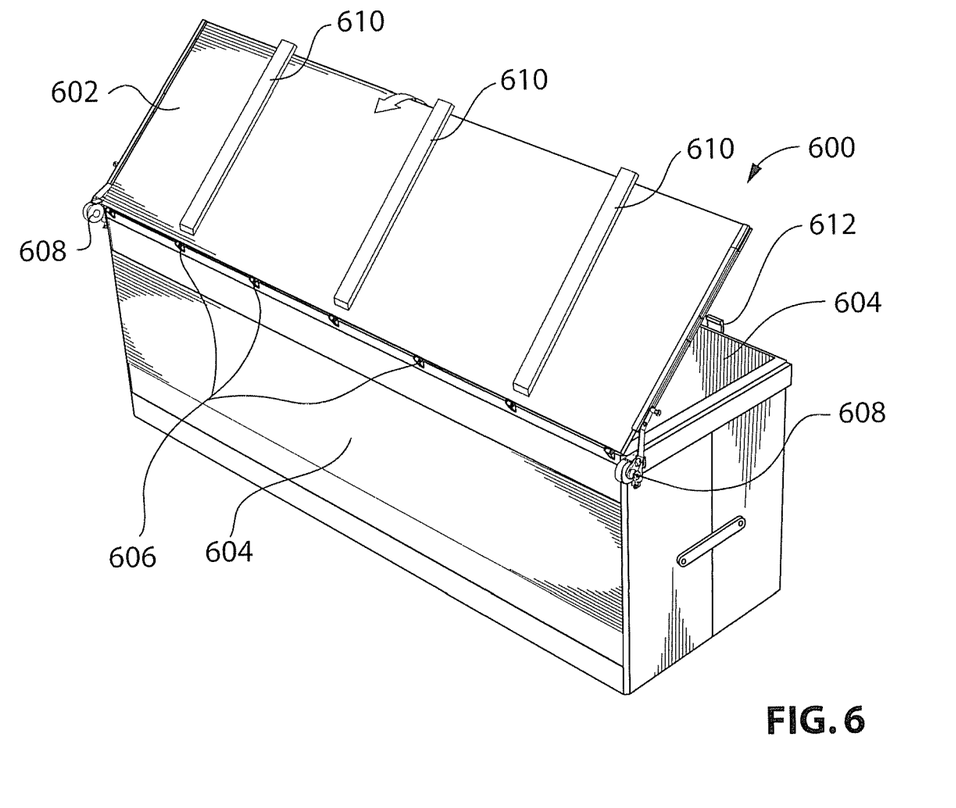
FIG. 6 illustrates a container including a one-piece roof connected to a sidewall.

While FIGS. 1 to 4 illustrate a roof that is made by two panels that open sideways, the convertible roof can be implemented in many different ways. For instance, FIG. 6 illustrates a container 600 of a convertible trailer including a one-piece roof panel 602 which is connected to one of the sidewalls 604 by hinges 606. Similar to the panels 102 and 104 of FIG. 1, the panel 602 is provided with a rotation mechanism 608 that allows it to move between a closed position that allows garbage to be loaded in the trailer using a compactor, and an open position that allows the trailer to be loaded from the top. The container 600 includes at least one locking bar 610 adjacent the hinge 606 and a lock 612 provided on the opposite sidewall for releasably locking the panel 602 when in closed position, and connecting the opposite sidewalls 604 to each other against the outward expansion pressure exerted by the loose materials being compacted. The lock 612 may be connected to panel 602 adjacent the locking bar 610, or may be connected to the locking bar directly.

The rotation mechanism 608 is similar to the bracket and motor combination illustrated in FIG. 5. Due to the size of the roof, which is approximately double the size of each panel 102 and 104, it is possible to use the rotating mechanism at opposite sides of the roof 602 e.g. one at the front and one at the back of the trailer, as illustrated in FIG. 6.

Figure 7:
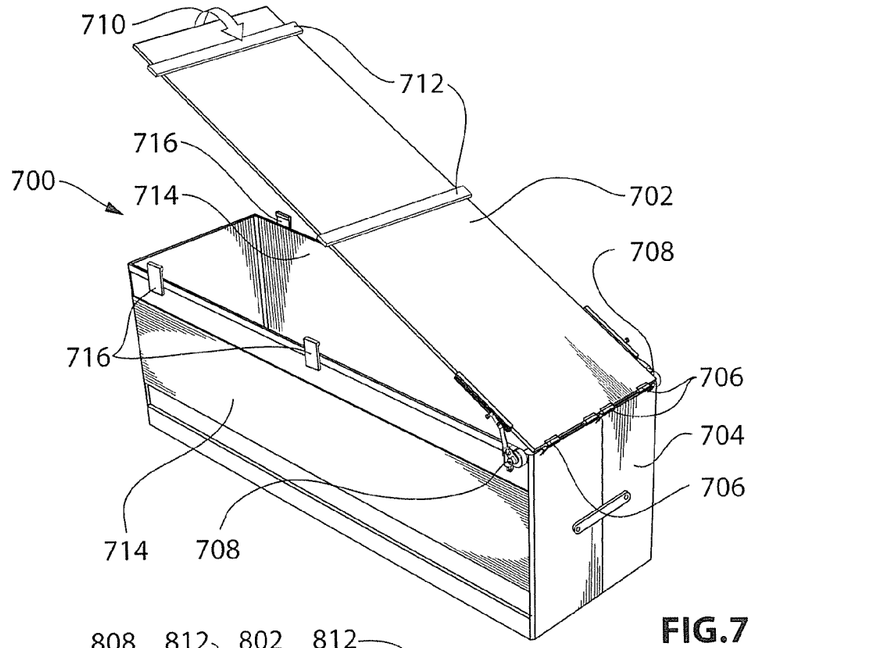
FIG. 7 illustrates a container including a one-piece roof connected to the rear wall.

FIGS. 7 illustrates a different embodiment, in which, the convertible trailer includes a container 700 comprising a one-piece roof panel 702 connected to the rear wall 704 by hinges 706. The convertible trailer 700 is equipped with a rotating mechanism 708 to open and close the roof 702. The roof 702 opens backward as indicated by arrow 710. The container 700 includes at least one locking bar 712 provided at the panel 702, and locks 716 provided at the opposite sidewalls 714 for releasably locking the panel 702 when in closed position, and for connecting the opposite sidewalls 714 to each other against the outward expansion pressure exerted by the loose materials compacted in the trailer. The locks 716 may be connected to the panel 702 adjacent the locking bar 712, or may be connected directly to the locking bar 712.

Figure 8:
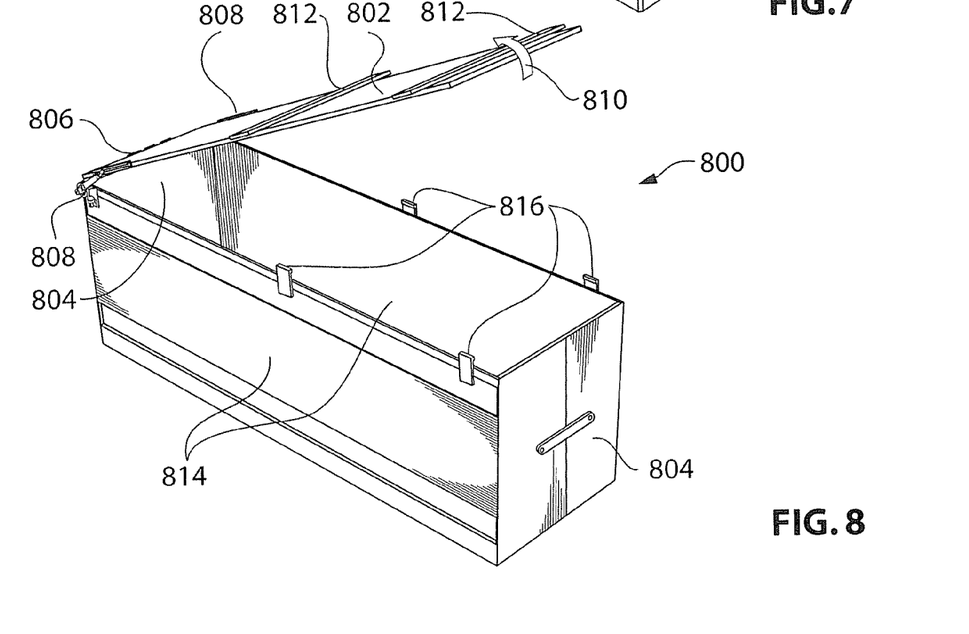
FIG. 8 illustrates a container including a one-piece roof connected to the front wall.

FIG. 8 illustrates an embodiment, in which, the convertible trailer includes a container 800 comprising a one-piece roof panel 802. In the embodiment illustrated in FIG. 8, the roof 802 is connected to the front wall 804 by hinges 806. The convertible trailer 800 is equipped with a rotating mechanism 808 to open and close the roof 802. The roof 802 opens forward as indicated by arrow 810.

Similar to container 700 of FIG. 7, the container 800 includes at least one locking bar 812 provided at the panel 802 and locks 816 provided at the sidewalls 814 for releasably locking the panel 802 in the closed position, and for connecting opposite sidewalls 814 to each other against the outward expansion pressure exerted by the loose materials compacted in the trailer. The locks 816 may be connected to the panel 802 adjacent the locking bar 812, or may be connected to the locking bar 812 directly.

Figure 9:
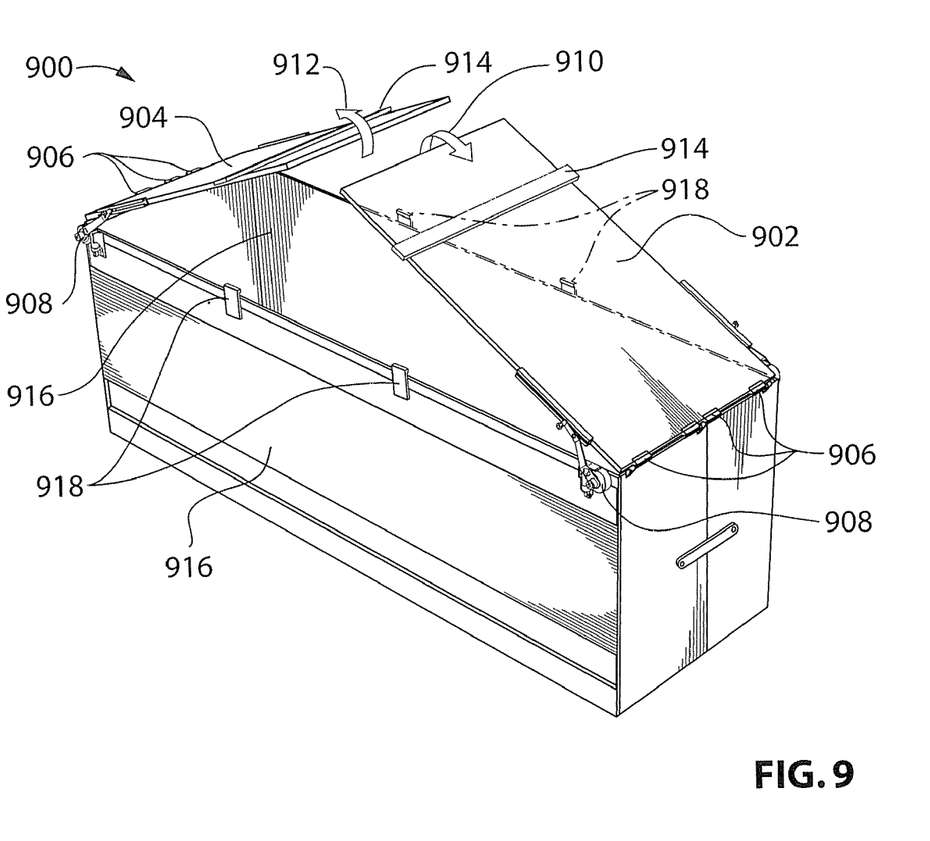
FIG. 9 illustrates a container trailer including two panels connected to the rear and front walls of the trailer.

In another embodiment, as illustrated by way of example in FIG. 9, the convertible trailer includes a container 900 comprising a convertible roof including two panels 902 and 904 connected to the rear and front walls of the trailer, respectively. Panels 902 and 904 are connected to the walls by hinges 906. The convertible trailer 900 is equipped with a rotating mechanism 908 to open and close the panels 902 and 904. Panel 902 opens backward as indicated by arrow 910, while panel 904 opens forward as indicated by arrow 912.

Each of panels 902 and 904 is provided with at least one locking bar 914, and sidewalls 916 are provided with locks 918 for releasably locking the panels 902 and 904 in the closed position, and for connecting opposite sidewalls 916 to each other against the outward expansion pressure exerted by the loose materials compacted in the trailer. The locks 918 may be connected to the panels 902 and 904 adjacent the locking bars 914, or may be connected directly to the locking bars 914.

Figure 10A:
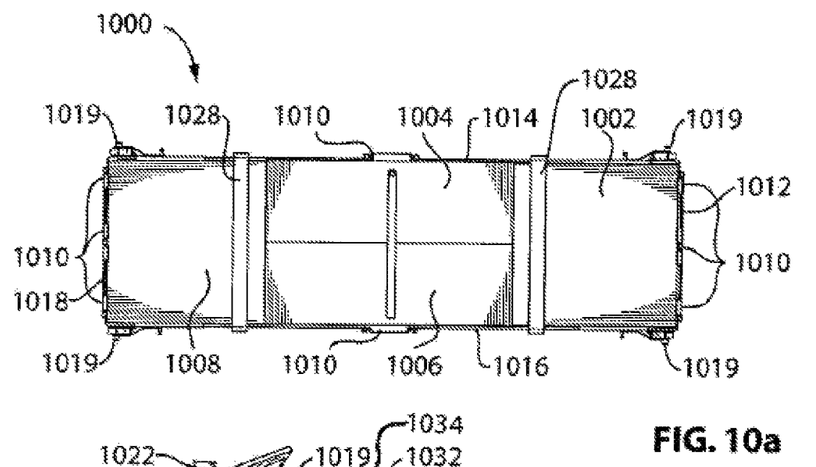
FIG. 10a is a top view of a container including a convertible roof comprising four panels in closed position.

FIG. 10a is a top view of a container 1000 of a trailer including a convertible roof comprising four panels 1002, 1004, 1006, and 1008, when the panels are in closed position. The panels are hinged to the walls by hinges 1010. Panels 1002, 1004, 1006, and 1008 are connected to the rear wall 1012, sidewalls 1014 and 1016, and front wall 1018, respectively.

Figure 10B:
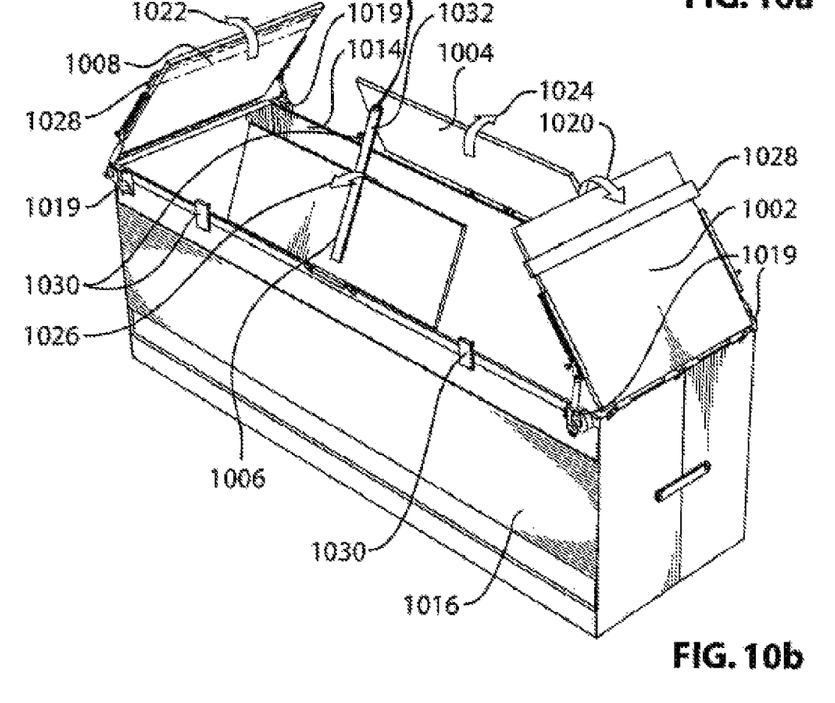
FIG. 10b illustrates an embodiment of the container of FIG. 10a, in which, all of the four panels are in open position.

FIG. 10b illustrates an embodiment of the convertible trailer 1000 of FIG. 10a, in which, all of the four panels are in an open position. As illustrated in FIG. 10b, the convertible trailer 1000 is equipped with a rotating mechanism 1019 to open and close the panels. Panel 1002 opens backward as indicated by arrow 1020, panel 1008 opens forward as indicated by arrow 1022, and panels 1004 and 1006 open sideways as indicated by arrows 1024 and 1026, respectively.

Panels 1002, and 1008 are provided with a locking bar 1028, and sidewalls 1014 and 1016 are provided with locks 1030 for releasably locking the panels 1002 and 1008 in the closed position, and for connecting the opposite sidewalls 1014 and 1016 to each other against the outward expansion pressure exerted by the loose materials compacted in the trailer.

Panels 1004 and 1006 may be locked to each other similar to panels 102 and 104 of FIGS. 1 and 4. That is, a locking bar 1032 may be provided on either or both of panels 1004 and 1006 aligned with or adjacent hinges 1010. The locking bar 1032 may be welded or permanently secured to one of the panels 1004 and 1006 at one side, and has one or more openings 1034 at the other side. The openings 1034 of the locking bar 1032 overlap one or more threaded openings in the other panel e.g. panel 1004 in FIGS. 10a and 10b, when the panels are in closed position for releasably securing the locking bar 1032 to panel 1004 using bolts or the like, and for connecting opposite sidewalls 1014 and 1016 to each other to prevent them from bulging out and deforming under the outward expansion pressure exerted by the loose materials compacted in the trailer.

Although all the four panels are shown open in FIG. 10b, it is possible to selectively choose one or more panels to open while the other panel(s) is in closed position.

Figure 11A:
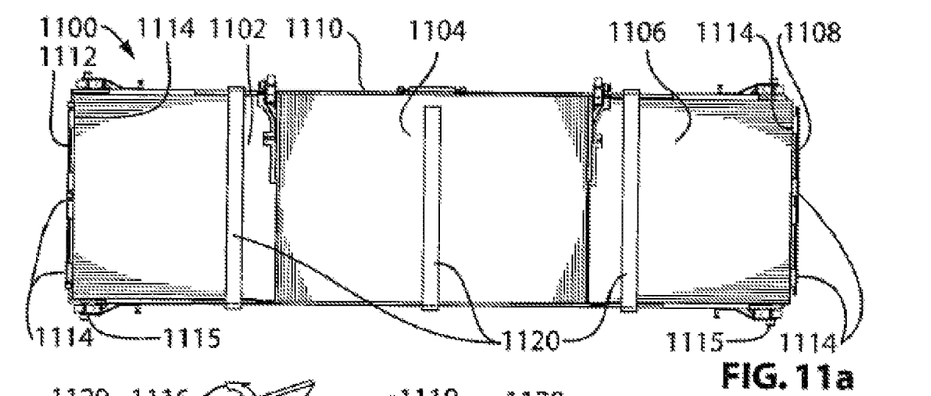
FIG. 11a is a top view of a container including a convertible roof comprising three panels in closed position.

FIG. 11a is a top view of a container 1100 of a trailer including a convertible roof comprising three panels 1102, 1104, and 1006, when the panels are in closed position. Panel 1106 is connected to rear wall 1108, panel 1104 is connected to one of the sidewalls 1110, and panel 1102 is connected to front wall 1112. The panels are connected to the walls by hinges 1114.

Figure 11B:
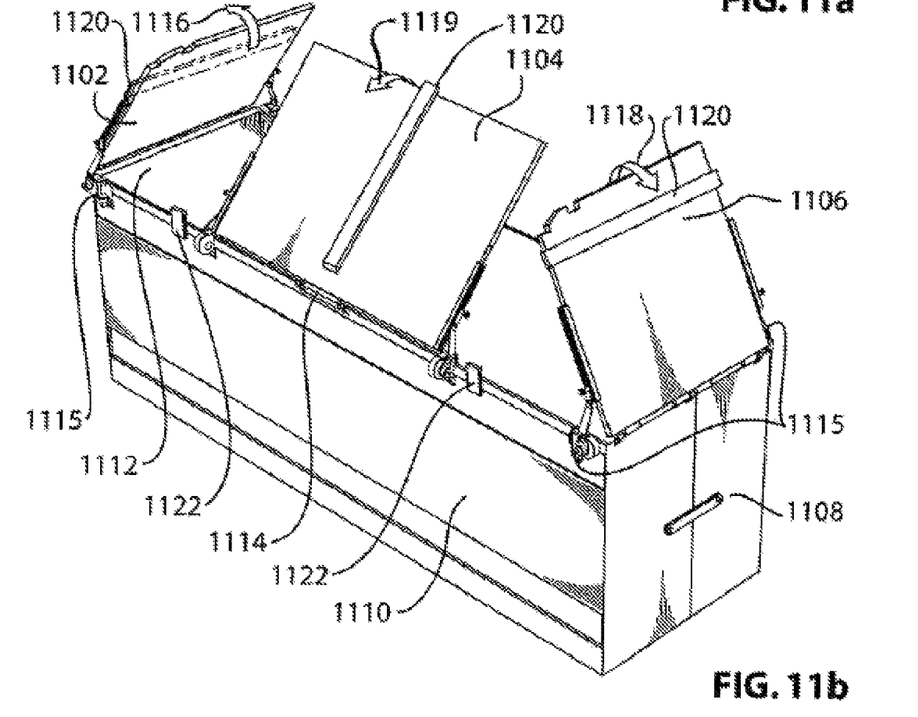
FIG. 11b illustrates an embodiment of the container of FIG. 11a, in which, all of the three panels are in open position.

FIG. 11b illustrates an embodiment of the convertible trailer 1100 of FIG. 11a. As illustrated in FIG. 11b, the convertible trailer 1100 is equipped with a rotating mechanism 1115 to open and close the panels. Panel 1102 opens forward as indicated by arrow 1116, panel 1106 opens backward as indicated by arrow 1118, and panel 1104 opens sideway as indicated by arrow 1119. Each of the panels is provided with a locking bar 1120 and the sidewalls are provided with locks 1122 for releasably locking the panels in the closed position and for connecting the opposite sidewalls 1110 to each other to prevent them from bulging out and deforming under the outward expansion pressure exerted by the loose materials compacted in the trailer. The locking bar 1120 of panel 1104 is provided aligned with and/or adjacent the hinge 1114 for providing a strong connection between the sidewalls 1110.

Although all the three panels are shown open in FIG. 11b, it is possible to selectively choose one or more panels to open while the other panel(s) is in closed position.

Figure 12A:
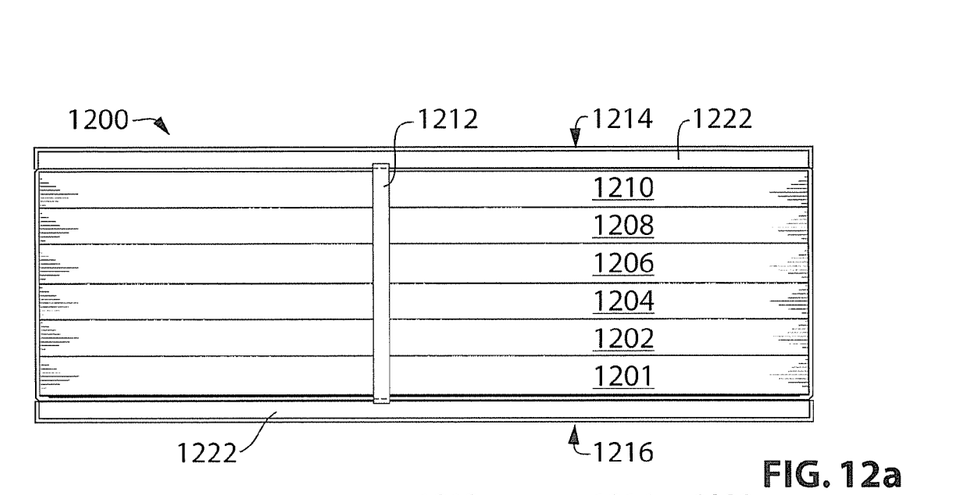
FIG. 12a is a top view of a container including a convertible roof comprising sliding panels movable perpendicular to the longitudinal direction of the trailer.

FIG. 12a is a top view of a container 1200 of a trailer including a convertible roof comprising a plurality of sliding panels 1201, 1202, 1204, 1206, 1208, 1210. The container includes at least one locking bar 1212 extending between the opposite sidewalls 1214 and 1216 in order to connect the sidewalls to each other for preventing the sidewalls and the panels 1201 to 1210 from bulging out and deforming under the outward expansion pressure exerted by the loose materials compacted in the trailer. Sliding panels 1201 to 1210 open and close in a direction perpendicular to the longitudinal direction of the trailer.

Figure 12B:
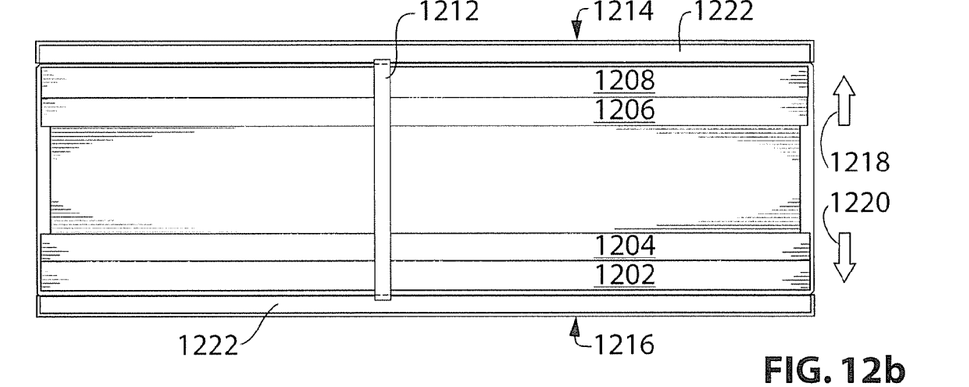
FIG. 12b illustrates an embodiment of the convertible roof of FIG. 12a when in the open position.

FIG. 12b illustrates an embodiment of the container 1200, in which, the convertible roof opens when a number of sliding panels move toward sidewall 1214 as indicated by arrow 1218, and the other sliding panels move toward sidewall 1216 as indicated by arrow 1220. The panels can be stored in storage compartments 1222 adjacent the sidewalls 1214 and 1216.

Figure 12C:
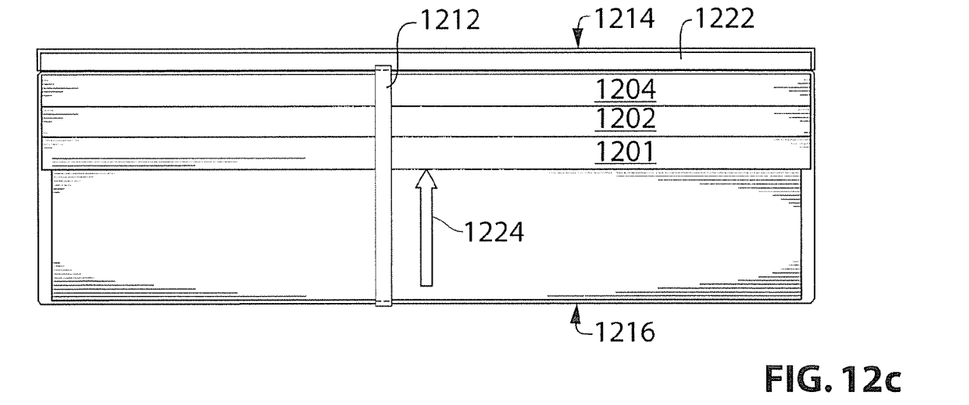
FIG. 12c illustrates another embodiment of the convertible roof of FIG. 12a when in the open position.

FIG. 12c illustrates a different embodiment of the container 1200, in which, the sliding panels move in one direction, as indicated by way of example, by arrow 1224. In the embodiment illustrated in FIG. 12c, only one storage compartment 1222 needs to be provided for storing the sliding panels. While FIG. 12c illustrates the sliding panels moving toward sidewall 1214, it is also possible to implement the system so that the panels move in the opposite direction toward sidewall 1216.

Figure 13A:
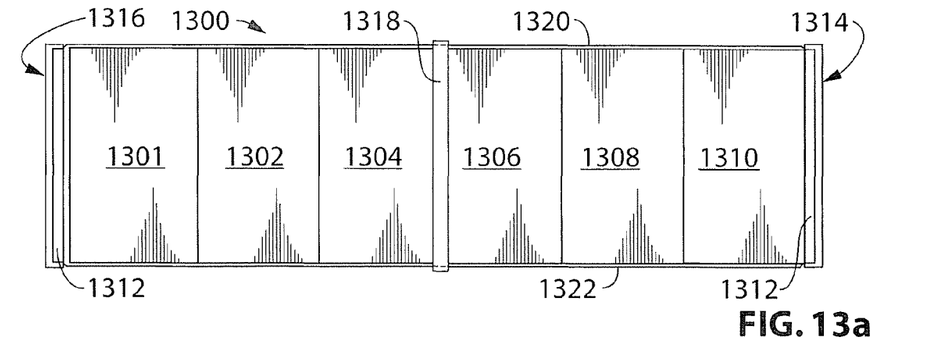
FIG. 13a is a top view of a container including a convertible roof comprising sliding panels movable parallel to the longitudinal direction of the trailer.

FIG. 13a is a top view of container 1300 of a convertible, in accordance with another embodiment of the invention, in which a convertible roof comprises a plurality of sliding panels 1301, 1302, 1304, 1306, 1308, 1310, etc., which open and close parallel to the longitudinal direction of the trailer 1300. A storage compartment 1312 is provided adjacent the rear wall 1314 and/or front wall 1316 of the trailer 1300 for storing the sliding panels when the roof is in the open position. The container 1300 includes at least one locking bar 1318 extending between the opposite sidewalls 1320 and 1322 in order to connect the sidewalls to each other for preventing the sidewalls and the panels 1301 to 1310 from bulging out and deforming under the outward expansion pressure exerted by the loose materials compacted in the trailer.

Figure 13B:
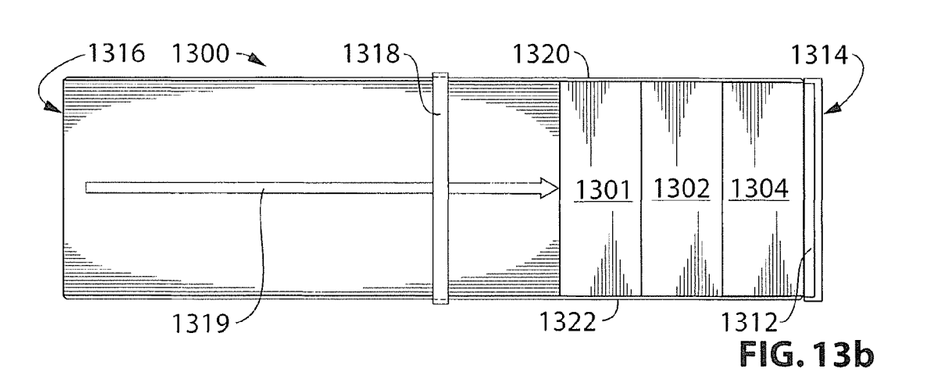
FIG. 13b illustrates an embodiment of the convertible roof of FIG. 13a when in the open position.

FIG. 13b illustrates an embodiment of the container 1300, in which the convertible roof opens when the sliding panels move in one direction as indicated by arrow 1319. While FIG. 13b illustrates the sliding panels moving toward the rear wall 1314, it is also possible to implement the system so that the panels move in the opposite direction toward the front wall 1316.

Figure 13C:
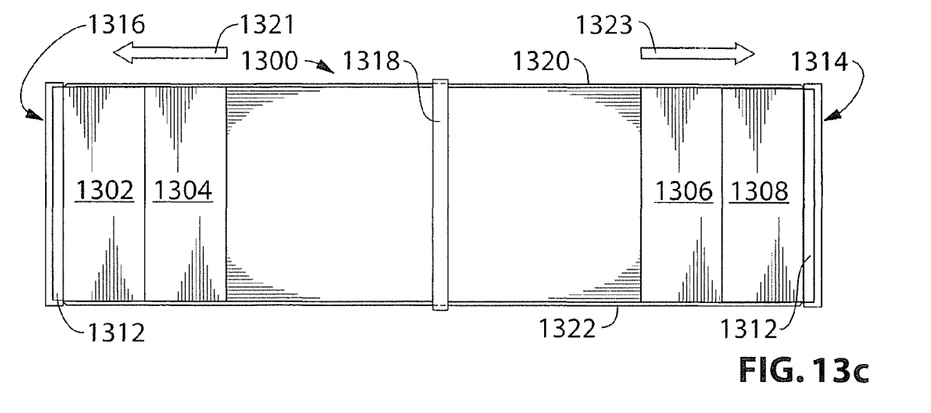
FIG. 13c illustrates another embodiment of the convertible roof of FIG. 13a when in the open position.

FIG. 13c illustrates another embodiment of the container 1300, in which the convertible roof opens when the panels move in opposite directions as indicated by arrows 1321 and 1323. That is, some of the panels move backward toward rear wall 1314, and the other ones move forward toward the front wall 1316.

In the embodiments shown in FIGS. 12a to 13c, the convertible roof is equipped with a drive mechanism (not shown) for moving the sliding panels between an open position and closed position. The implementation of such rotation mechanism is known for someone of skill in the art, and need not to be described in detail herein.

Additionally, while the embodiments shown and described herein, disclose a roof that is completely convertible, it is also possible to provide a roof that is partially convertible by having a convertible portion and a stationary portion. It is also possible to have a convertible roof that is made of both sliding panels, in accordance with one of the embodiments shown in FIGS. 12a to 13c, and rotating panels in accordance with one of the embodiments shown in FIGS. 1 to 11b.

Moreover, the movement of the rotating and/or sliding panels may be stopped and/or paused at any position desired.

While the embodiments shown in FIGS. 1 to 13c illustrate a longitudinal container, it is possible to implement the convertible roof of the invention in a trailer having oval, cylindrical, or any polygonal shaped container including a floor, a sidewall, and an access door for loading compressed materials when the convertible roof is in closed position.

Furthermore, different locks may be used for locking the panels in closed positions for connecting opposite sidewalls by the locking bar against the outward pressure of the compressed materials. The implementation and details of such locks are known in the art, and will not be described in detail herein.

In the preceding description, for purposes of explanation, numerous details are set forth in order to provide a thorough understanding of the embodiments of the invention. However, it will be apparent to one skilled in the art that these specific details are not required in order to practice the invention The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A convertible trailer comprising:
a chassis;
a set of wheels for rollably driving said chassis on the ground;
a rigid container carried by the chassis comprising a floor, a wall, and a roof;
an access door for loading loosely compressed materials into the container;
said roof including a movable rigid panel connected to the wall of the container, and movable between a closed position wherein the panel forms part of a solid roof that permits the container to be loaded with loosely compressed materials from the access door, and an open position wherein the container can be loaded from the top with bulk material; and
a locking bar for selectively maintaining the panel in the closed position against outward pressure exerted by the loosely compressed materials when loaded in the container and for strengthening the wall against the outward pressure.

2. The convertible trailer of claim 1, wherein the container includes a rotation mechanism for moving the panel between the closed position and the open position.

3. The convertible trailer of claim 1, wherein the roof includes a stationary portion, and a convertible portion.

4. The convertible trailer of claim 2, wherein the container is rectangular shaped, and the wall of the container includes a rear wall, a front wall and two opposite sidewalls.

5. The convertible trailer of claim 2, wherein the rotation mechanism is stoppable at any position of the panels.

6. A convertible trailer, comprising:
a chassis;
a set of wheels for rollably driving said chassis on the ground;
a rigid container carried by the chassis comprising a floor, a wall, and a roof;

an access door for loading loosely compressed materials into the container;

said roof including a movable rigid panel connected to the wall of the container, and movable between a closed position wherein the panel forms part of a solid roof that permits the container to be loaded with loosely compressed materials from the access door, and an open position wherein the container can be loaded from the top with bulk material; and a locking bar for selectively maintaining the panel in the closed position against outward pressure exerted by the loosely compressed materials when loaded in the container and for strengthening the wall against the outward pressure;

wherein the container includes a rear wall, a front wall and two opposite sidewalls; and wherein the roof includes two panels, one panel connected to one of the sidewalls and the other panel connected to one of the rear and front walls.

7. The convertible trailer of claim 6, wherein the convertible roof includes three panels, one connected to one of the sidewalls, and the other two are connected to the front and rear walls.

8. The convertible trailer of claim 6, wherein the convertible roof includes three panels, one connected to one of the front and rear walls, and the other two are connected to the sidewalls.

9. The convertible trailer of claim 6, wherein the convertible roof includes four panels, one panel connected to each wall.

10. A convertible trailer comprising:
a chassis;
a set of wheels for rollably driving said chassis on the ground;
a rigid container carried by the chassis comprising a floor, a wall, and a roof;
an access door for loading loosely compressed materials into the container;
said roof including a movable rigid panel connected to the wall of the container, and movable between a closed position wherein the panel forms part of a solid roof that permits the container to be loaded with loosely compressed materials from the access door, and an open position wherein the container can be loaded from the top with bulk material; and
a locking bar for selectively maintaining the panel in the closed position against outward pressure exerted by the loosely compressed materials when loaded in the container and for strengthening the wall against the outward pressure;
wherein the container includes a rear wall, a front wall and two opposite sidewalls; and
wherein the roof includes two panels hinged to the opposite sidewalls of the container, and wherein the locking bar is secured to one panel and includes an opening which overlaps at least one threaded hole in the other panel when the panels are in closed position, for releasably locking two panels in the closed position.

11. The convertible trailer of claim 10, wherein the locking bar is provided adjacent and substantially aligned with the hinges connecting the panels to the sidewalls, for connecting the opposite sidewalls to each other against the outward pressure exerted by the loosely compressed materials compacted in the trailer.

12. A convertible container for bulk goods or loosely compacted materials, comprising:
a floor;
a wall with
an access door for loading loosely compressed materials into the container;
a roof, said roof including a movable rigid panel connected to the wall of the container, and movable between a closed position wherein the panel forms part of a solid roof that permits the container to be loaded with loosely compressed materials from the access door, and an open position wherein the container can be loaded from the top with bulk material; and
a locking bar for selectively maintaining the panel in the closed position against outward pressure exerted by the loosely compressed materials when loaded in the container and for strengthening the wall against the outward pressure.

13. A convertible trailer comprising:
a chassis;
a set of wheels for rollably driving said chassis on the ground;
a rigid container carried by the chassis comprising a floor, a roof, a front wall, a rear wall and two sidewalls;
an access door for loading loosely compressed materials into the container;
said roof including a plurality of rigid sliding panels movable in tracks between a closed position wherein the panels form part of a solid roof that permits the container to be loaded with loosely compressed materials from the access door, and an open position wherein the container can be loaded from the top with bulk material; and
a locking bar for selectively maintaining the panel in the closed position against outward pressure exerted by the loosely compressed materials when loaded in the container and for strengthening the wall against the outward pressure.

14. The convertible trailer of claim 13, wherein the sliding panels move in a direction that is perpendicular to the longitudinal direction of the trailer.

15. The convertible trailer of claim 14, wherein some of the panels move toward one of the sidewalls and the other panels move toward the opposite sidewall to open.

16. The convertible trailer of claim 13, wherein the sliding panels move in a direction that is parallel to the longitudinal direction of the trailer.

17. The convertible trailer of claim 16, wherein some of the panels move toward the rear wall and the other panels move toward the front wall to open.

18. The convertible trailer of claim 13, wherein the container is provided with a drive mechanism for moving the panels between the closed position and the open position.

19. The convertible trailer of claim 18, wherein the drive mechanism is stoppable at any position of the panels.

20. The convertible trailer of claim 13, wherein the roof includes a stationary portion, and a convertible portion.

* * * * *